US008918763B2

(12) United States Patent
McKee et al.

(10) Patent No.: US 8,918,763 B2
(45) Date of Patent: Dec. 23, 2014

(54) MARKED TEST SCRIPT CREATION

(71) Applicant: Hewlett-Packard Development Company, L.P., Houston, TX (US)

(72) Inventors: Bret A. McKee, Fort Collins, CO (US); Scott N. D'Angelo, Fort Collins, CO (US); Brian T. Zimpfer, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 88 days.

(21) Appl. No.: 13/754,467

(22) Filed: Jan. 30, 2013

(65) Prior Publication Data
US 2014/0215440 A1   Jul. 31, 2014

(51) Int. Cl.
*G06F 9/44*      (2006.01)
*G06F 11/36*    (2006.01)

(52) U.S. Cl.
CPC ................... *G06F 11/3676* (2013.01)
USPC ......... 717/124; 717/106; 717/126; 714/38.14

(58) Field of Classification Search
None
See application file for complete search history.

(56) References Cited

U.S. PATENT DOCUMENTS

| | | | | |
|---|---|---|---|---|
| 6,725,368 | B1 * | 4/2004 | Liebenow | 713/2 |
| 7,100,195 | B1 * | 8/2006 | Underwood | 726/2 |
| 7,415,635 | B1 * | 8/2008 | Annangi | 714/38.12 |
| 7,480,900 | B1 * | 1/2009 | Zhou et al. | 717/132 |
| 7,610,578 | B1 * | 10/2009 | Taillefer et al. | 717/124 |
| 7,797,687 | B2 | 9/2010 | Tillmann et al. | |
| 2004/0107415 | A1 * | 6/2004 | Melamed et al. | 717/124 |
| 2004/0113607 | A1 * | 6/2004 | Co et al. | 324/158.1 |
| 2004/0199818 | A1 * | 10/2004 | Boilen et al. | 714/25 |
| 2005/0193269 | A1 * | 9/2005 | Haswell et al. | 714/38 |
| 2006/0230320 | A1 | 10/2006 | Salvador et al. | |
| 2008/0016396 | A1 * | 1/2008 | Higashi et al. | 714/30 |
| 2009/0172647 | A1 | 7/2009 | Telang | |
| 2010/0058114 | A1 * | 3/2010 | Perkins et al. | 714/39 |
| 2011/0296384 | A1 * | 12/2011 | Pasternak | 717/124 |
| 2012/0221893 | A1 * | 8/2012 | Bai et al. | 714/27 |
| 2012/0222014 | A1 | 8/2012 | Peretz et al. | |
| 2012/0266185 | A1 | 10/2012 | Davis et al. | |
| 2012/0324426 | A1 * | 12/2012 | Smith et al. | 717/124 |
| 2013/0097307 | A1 * | 4/2013 | Vazac et al. | 709/224 |
| 2014/0019937 | A1 * | 1/2014 | Clark et al. | 717/123 |
| 2014/0047278 | A1 * | 2/2014 | Sheye | 714/38.1 |

OTHER PUBLICATIONS

Unknown., "Unit Testing with the Unit Test Framework," Retrieved from http://cdn.ttgtmedia.com/digitalguide/images/Misc/professionalvsts_ch14.pdf, Dec. 2012, pp. 357-392.

* cited by examiner

*Primary Examiner* — Chameli Das

(57) ABSTRACT

Systems, methods, and machine-readable and executable instructions are provided for marked test script creation. Marked test script creation can include identifying a number of test scenarios that are associated with a program under test. Marked test script creation can include identifying a number of parameter types that are associated with the number of test scenarios. Marked test script creation can include including the number of test scenarios and the number of parameter types in a marked test script. Marked test script creation can include marking the number of test scenarios in the marked test script with a mark that identifies the number of test scenarios as requiring further processing. Marked test script creation can include creating, with a computing device, a number of un-marked test scripts from the marked test script wherein the number of un-marked test scripts are used to test the program under test.

14 Claims, 3 Drawing Sheets

MARKED TEST SCRIPT CREATION

BACKGROUND

A life cycle of an application can begin at a designing stage and can end at a distribution stage of the application. An application can be tested before it is distributed. The testing of an application can find flaws in the application before the application is distributed. Finding flaws and resolving the flaws can provide for a more enjoyable user experience than if the flaws are not resolved.

DETAILED DESCRIPTION

Figure 1:
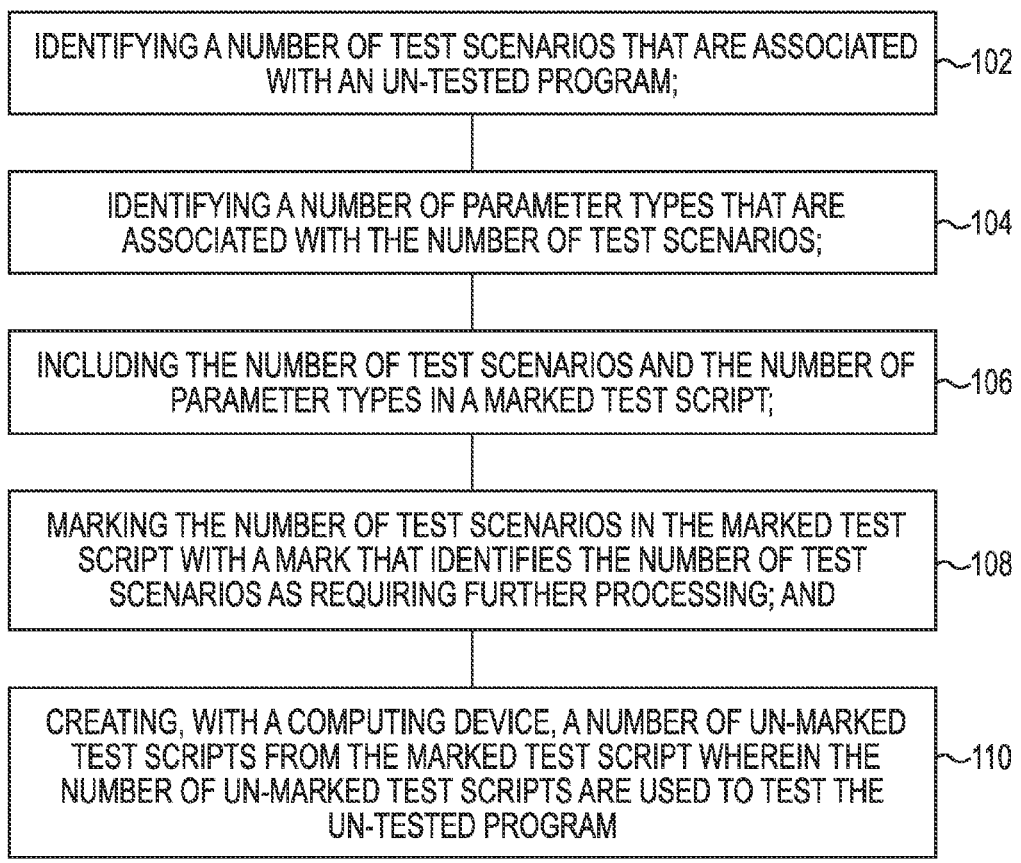
FIG. 1 is a flow chart illustrating an example of a method for marked test script creation according to the present disclosure.

A lifecycle of an application can include a development stage, a testing stage, and/or a distribution stage, among other stages. A testing stage can include the creation of a number of test scripts that can be used to test a number of functions that are associated with an application.

As used herein, an application can be machine readable instructions that when executed by a processor, e.g., a number of processors, perform a number of functions. An application may be referred to herein as a program.

The creation of a number of test scripts can be time consuming. The creation of a number of test scripts can require identifying a number of test scenarios that can be included in the test script to determine whether the functions associated with program perform as expected.

In a number of previous approaches, the creation of a number of test scripts is performed by users, e.g., IT personal, that can identify a number of test scenarios. The users can manually identify an expected result for each of the test scenarios. However, utilizing a user to create a number of test scripts with a number of test scenarios creates a vulnerability for user error as the number of test scripts and the test scenarios grow. For example, a user can introduce a syntactical mistake, e.g., syntax not associated with the test script, which is associated with a specific syntax that is associated with a large number of scripts into a test script. Furthermore, manually determining an expected response, e.g., result, for each of the test scenarios in a test script can be time consuming and can further introduce the possibility of user error.

In a number of examples of the present disclosure, human error can be removed by automating the creation of a number of tests. Human error can also be removed by generating a number of expected results to the number of tests based on the results of implementing the number of tests on a program that is not being tested.

In a number of examples of the present disclosure, a number of test scripts can be created from a number of marked test scripts. The marked test scripts can include a number of test scenarios wherein each of the test scenarios identifies a number of parameter types that can be replaced with actual parameters to create an instance of a test scenario. The instances of the test scenario can be included in the test scripts that can be used to test a program. The marked test script can include a number of marks that identify a number of test scenarios. The mark can indicate to a computing device that creates a number of instances of the test scenario that an instance of the test scenario can be created from the marked test scenario. The instance can be created based on a parameters file that includes the actual parameters that can replace the parameter types in a test scenario. Creating a number of instances of a test scenarios from a marked test scenario can limit user errors in formulating the instances of the test scenarios and can make creating large numbers of test scripts possible.

The formulated test scenarios can be tested on two different programs and/or on two different versions of the same program. Two different programs can define two different systems. For example, the instances of the test scenarios can be used to test a program under test and to generate expected results from a benchmark program wherein the program under test is a different system then the benchmark program. In a number of examples, the program under test can be a later version of the benchmark program, the program under test can be compared against the benchmark program to ensure that the program under test functions as the benchmark program functions. The results from each of the program under test and the benchmark program can be compared against each other to determine if the test was successful or if the test failed. A successful test and a failed test will be discussed below. Comparing the results of a program under test against the results of a benchmark program can provide a number of expected results for each of the instances of a test scenario without requiring that a user provide the expected results.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a flow chart illustrating an example of a method for marked test script creation according to the present disclosure. The method can be performed by a computing device that can include machine readable instructions, e.g., program and/or application, which can be tested. At 102, a number of test scenarios that are associated with a program under test can be identified. A program under test can be a program that will be tested. The program under test can receive input and can produce a result. The program under test can perform a number of functions which can be associated with the result. Given that a program, e.g., application, was recently developed, the program can be identified as a program under test in the testing stage of a life cycle that is associated with the program.

As used herein, a test scenario can be a template for an interaction with a program interface wherein the interaction instructs a program to perform a given function. For example, a test scenario can be the following template "CALL ([Parameter 1], [Parameter 2], [Parameter 3])". The syntax "CALL" can represent a command that a program interface recognizes.

A program interface can be a communication mechanism between a program and a third party, e.g., user and/or computing device. The program interface can receive input for the program. The program interface can display a result associated with a received input. The program can include the program interface.

At 104 a number of parameter types that are associated with the number of test scenarios can be identified. For example, a parameter type can be "Name" while actual parameter values can be "James", "John", and/or "Ben", for example. A parameter type can include "[Parameter 1]", "[Parameter 2]", and "[Parameter 3]", for example.

A parameter type can represent any number of actual parameters that can be substituted for the parameter type to create an instance of a test scenario. An actual parameter can be a character and/or sequence of characters that can be used by a program under test to perform a number of functions. For example, if a parameter type is an "int", e.g., a number type, then the actual parameter can be "1", "2", and/or "3", among other numbers. The actual parameters "1", "2", and/or "3" can be used by a program that under test to perform a number of functions. In a number of examples, a parameter type "[Parameter1]" can represent any one of the following actual parameters "param1-1", "param1-2", and/or "param1-3". A parameter type "[Parameter 2]" can represent any one of the following actual parameters "param2-1", "param2-2", and/or "param2-3". A parameter type "[Parameter 3]" can represent any one of the following actual parameters "param3-1", "param3-2", and/or "param3-3".

In a number of examples, a test scenario can be a template that includes syntax that is not accepted by a program interface. The test scenario "CALL ([Parameter 1], [Parameter 2], [Parameter 3])" can be rejected by the program interface because a syntax that is associated with the program interface does not recognize the parameter types "[Parameter 1]", "[Parameter 2]", and/or "[Parameter 3]" as actual parameters. A computing device can identify a parameter type due to the syntax associated with the parameter type to substitute a number of actual parameters for the parameter type which is can be used to create a number of tests.

Substituting an actual parameter for a parameter type in a test scenario can create an instance of a test scenario. If a test scenario is "CREATE TABLE [table_name] ([column_name1] [data_type], [column_name2] [data_type], [column_name3] [data_type])", which can be a template for creating a table in a database, then an instance of a test scenario can be "CREATE TABLE students (first_name varchar(255), last_name varchar(255), age int)". The actual parameter "students" can replace parameter type "[table_name]", the actual parameter "first_name" can replace parameter type "[column_name1]", the actual parameter "last_name" can replace parameter type "[column_name2]", the actual parameter "age" can replace parameter type "[column_name3]", and the actual parameters "varchar(255)" or "int" can replace parameter type "[data_type]".

In various examples, an instance of a test scenario can be "CALL (param1-1, param2-1, param3-1)", for example, wherein the actual parameter "param1-1" replaces parameter type "[Parameter 1]", the actual parameter "param2-1" replaces parameter type "[Parameter 2]", and the actual parameter "param3-1" replaces parameter type "[Parameter 3]". An instance of a test scenario can include syntax that the program interface recognizes and which can be processed by the program to perform a given function as defined by the actual parameters.

At 108, the number of test scenarios in the marked test script can be marked with a mark that identifies the number of test scenarios as requiring further processing. In a number of examples, the mark can be an in-line mark. An in-line mark can be a designated character and/or sequence of characters that can identify a number of test scenarios. The mark can designate the test scenarios as needing further processing to comply with a syntax that is associated with the program interface, e.g., syntax that the program interface accepts. A mark can be a "+" character, for example, wherein the mark is not associated with a syntax that is associated with the program under test. The "+" character can be placed at a beginning of a test scenario and/or at a different position within a line that is associated with the test scenario. For example, "+CALL ([Parameter 1], [Parameter 2], [Parameter 3])" can designate the test scenario as needing further processing. The mark can be located at any position within the same line as the test scenario. In a number of examples, the mark can be located before the line that is associated with the test scenario and/or after the line that is associated with the test scenario.

In various examples, a mark can be associated with a test scenario wherein the association between the mark and the test scenario identifies the test scenario as needing further processing. A mark can be associated with a test scenario through an object. For example, given that a test scenario is represented as a method then the object can include a representation of a mark in the form of a variable and/or other designation of the mark. As used herein an object can be a class, function, and/or method that is associated with machine readable instructions, among other types of objects.

At 110, a number of un-marked test scripts can be created from the marked test script wherein the number of un-marked test scripts are used to test the program. The number of un-marked test scripts can be used to test the program because instances of the test scenario can be used by the program to perform a function whereas the test scenario may not be used by the program to perform a function. An un-marked test script can include a number of instances of the test scenarios. In the un-marked test scripts, the number of instances of a test scenario can be clear of a mark that is associated with the test scenarios in the marked test script. The instances of the marked test script can be created from the marked test script. For example, a number of instances of the test scenario can be "CALL (param1-1, param2-1, param3-1)", "CALL (param1-2, param2-1, param3-1)", "CALL (param1-3, param2-1, param3-1)", . . . , "CALL (param1-3, param2-3, param3-3)", wherein the number of instances are created from the test scenario "+CALL ([Parameter 1], [Parameter 2], [Parameter 3])" in the marked test script. A different un-marked test script can be created for each of the test scenarios in the marked test script.

Figure 2:
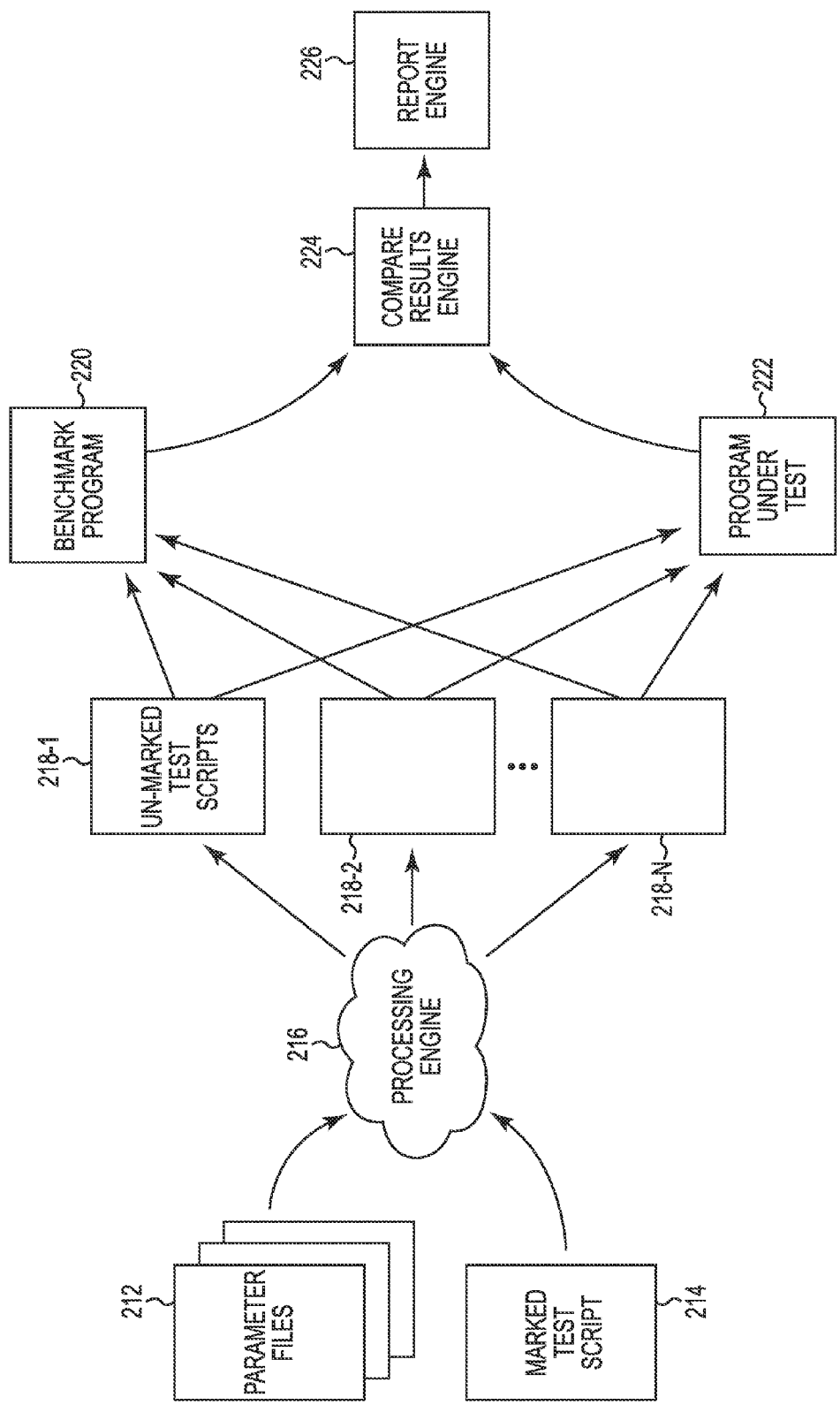
FIG. 2 is a diagram illustrating an example of marked test script creation according to the present disclosure.

FIG. 2 is a diagram illustrating an example of marked test script creation according to the present disclosure. FIG. 2 includes a number of parameter files 212, a marked test script 214, a processing engine 216, a number of un-marked test scripts 218-1, 218-2, . . . , 218-N, a benchmark program 220, a program under test 222, a compare results engine 224, and a report engine 226.

A marked test script 214 can include a number of test scenarios that are marked to convey that the test scenarios need further processing before they can be used to test a program under test 222. In a number of examples, the marked test script 214 is created by a user, e.g., IT personal. The marked test script 214 can also be created by a computing device. For example, a computing device can identify a number of test scenarios and a number of parameter types from the machine readable instructions associated with the program.

The number of test scenarios can be marked as described in connection with FIG. 1. Each of the number of test scenarios can include a number of parameter types. Each of the parameter types can be associated with one of the parameter files 212. For example, a parameter type "[Parameter 1]" can be associated with a first parameter file, a parameter type "[Parameter 2]" can be associated with a second parameter file, a parameter type "[Parameter 3]" can be associated with a third parameter file, among other parameter types and other parameter files.

A parameter file can include a number of actual parameters that can be substituted for a parameter type in a test scenario to create an instance of the test scenario. That is, an instance of the test scenario can be created by when an actual parameter is substituted for a parameter type. The substitution allows for a number of instances of the test scenario to be created and to be used in the testing of a program under test 222 without the possibility of introducing a number of user errors into the tests used to test the program under test 222. For example, a first parameter file that is associated with a parameter type "[Parameter 1]" can include actual parameters "param1-1", "param1-2", and/or "param1-3". A parameter file can be a first control point that defines the possible instances of the test scenarios that can be created. If actual parameter "param1-3" is removed from the parameter file, then instances of test scenarios that are associated with the first parameter file will not include the actual parameter "param1-3". A processing engine 216 can be a second control point which will be discussed below.

In a number of examples, each of the parameter types can be associated with a single parameter file. For example, all of the actual parameters associated with parameter types "[Parameter 1]", "[Parameter 2]", and/or "[Parameter 3]" can be included in a parameter file, however examples are not so limited. The actual parameters can be grouped within the parameter file by a number of section headings that correspond with each of the parameter types.

The parameter file can define the actual parameters individually and/or in ranges. For example, a number of actual parameters can be defined in a parameter file with a notation "param1-1:1-3" which defines actual parameters "param1-1", "param1-2", "and param1-3".

A processing engine 216 can create a number of un-marked test scripts 218-1, 218-2, . . . , 218-N, e.g., referred to generally as un-marked test scripts 218, from the marked test script. The processing engine 216 can create an un-marked test script for each of the test scenarios in the marked test script 214. For example, a first test scenario can be associated with an un-marked test script 218-1, a second test scenario can be associated with an un-marked test script 218-2, . . . , and an N test scenario can be associated with an un-marked test script 218-N. Each of the un-marked test scripts 218 can include a number of instances of a test scenario. For example, the un-marked test script 218-1 that is associated with the test scenario, "+CALL ([Parameter 1], [Parameter 2], [Parameter 3])" can include the instances "CALL (param1-1, param2-1, param3-1)", "CALL (param1-2, param2-1, param3-1)", . . . , and/or "CALL (param1-3, param2-3, param3-3)", where the parameter types have been replaced with actual parameters to create the instance of the test scenarios.

In a number of examples, the processing engine 216 can create an un-marked test script from the marked test script 214 wherein the un-marked test script includes a number of instances for each of the test scenarios in the marked test script 214. Instances of a test scenario can be grouped in the un-marked test script. For example, a number of section headers can identify which instances where created from which test scenarios. A first header can group all of the instances that were created from a first test scenario while a second header can group all of the instances that were created from a second test scenario.

The processing engine 216 can be a second control point which can determine the tests that will be implemented on the benchmark program 220 and/or the program under test 222. The processing engine 216 can be a second control point because the processing engine 216 determines which instances of a test scenario are included in the un-marked test scripts 218. For example, in a test scenario with one parameter type that is associated with a parameter file that includes three actual parameters, the processing engine 216 can determine a number of instances of the test scenario that are created. By way of example, the processing engine 216 can include a first instance that is associated with a first actual parameter and a second instance that is associated with the second actual parameter but not a third instance that is associated with a third actual parameter.

The processing engine 216 can determine a number of instances of a test scenario to include in the un-marked test scripts 218 based on a desired number of tests that are to be run on the program under test 222. For example, the processing engine 216 can create a number of instances of the tests scenarios equal to a predefined variable. For an initial test of the program under test 222, the processing engine 216 can select a limited set of instances of a test scenario. For a thorough testing of the program under test, the processing engine 216 can select a greater set of instances of a test scenario than those selected for the initial test. In various examples, the processing engine 216 can select a random set of instances of a test scenario from all of the possible instances of a test scenario. A selection pattern associated with selecting the number of instances can be associated with the actual parameters that the processing engine 216 selects from the parameter files 212 to replace the parameter types in the test scenario.

A single un-marked test script and/or a number of un-marked test scripts 218 can be used to test the program under test 222. For example, the test script 218-1 can be used to test the program under test 222 with a first number of instances of the test scenario, the test script 218-2 can be used to test the program under test 222 with a second number of instances of the test scenario, . . . , the test script 218-N can be used to test the program under test 222 with an N number of instances of the test scenario. Program under test 222 can create and/or generate a result for each of the instances that the program under test 222 receives as input through a program interface. A number of expected results are needed to determine whether the program under test 222 passed or failed each of the tests associated with the instances.

The number of expected results can be provided by a benchmark program 220. The benchmark program 220 is an application that receives input and produces a result after performing a number of functions that are based on the received input. The benchmark program 220 can receive as input the number of instances that are associated with the un-marked test scripts 218. The benchmark program 220 can perform a number of functions that are associated with the received input. For example, if the benchmark program 220 is a database and if an instance includes instructions to create a table, then the benchmark program 220 can perform a number of functions associated with the creation of the table, and can express a result by indicating that the table has been created and/or by actually creating the table, among other results that can be expressed by the benchmark program 220. In a number of examples, the internal state of the benchmark program 220 and/or the program under test 222 can be results. For instance, a data structure that is created by the benchmark program 220 can be a result even through no output is generated.

The results produced from testing the benchmark program 220 can be marked as expected results. The expected results can be compared at a compare results engine 224. The results can be compared to determine whether the program under test 222 passed or failed any given test. As used herein, a test can include providing a program with input, e.g., instances of a test scenario, to determine whether the program will produce an expected result that is associated with the provided input. For example, an instance "CALL (param1-1, param2-1, param3-1)" of a test scenario can be received by a program interface that is associated with the program under test 222. The program under test 222 can perform a number of functions that are associated with the received input. In a number of examples, a result associated with the instance can be an internal state of the program under test 222 and/or an output that is generated by the program under test. The same test can be applied to the benchmark program 220. The results associated with the benchmark program 220 can be compared to the results associated with the program under test 222.

A report differences engine 226 can report a failed test when a response that is associated with the benchmark program 220 is not equal to a response that is associated with the program under test 222. For example, given that a first response "table created" is associated with the benchmark program 220 and that a second response "table not created" is associated with the program under test 222, then a report differences engine 226 can report that the program under test 222 failed a test associated with an instance of a test scenario because the first response is not equal to the second response and/or because the first response is not the equivalent of the second response. That is, a test can be successful even through a first response "table not created" that is associated with the benchmark program 220 reports a failure to make the table and a second response "table not created" that is associated with the program under test 222 reports a failure to make the table because the first response and the second response are equal to each other.

In a number of examples, a first syntax can be different than a second syntax, wherein the first syntax is associated with a program interface that is associated with the benchmark program 220 and the second syntax is associated with a program interface that is associated with the program under test 222. The number of instances of the test scenarios can be modified before the benchmark program 220 and/or the program under test 222 receive the instances. The modification can insure that the number of instances of the test scenarios are compatible with the syntax requirement associated with the bench program 220 and/or the program under test 222.

The examples used herein have been in the context of a program interface that is associated with a command line interface (CLI). In a number of examples of the present disclosure, a program interface that is associated with the benchmark program 220 and/or the program under test 222 can receive the instances of the test scenarios through a graphical user interface (GUI), or other types of interfaces.

Figure 3:
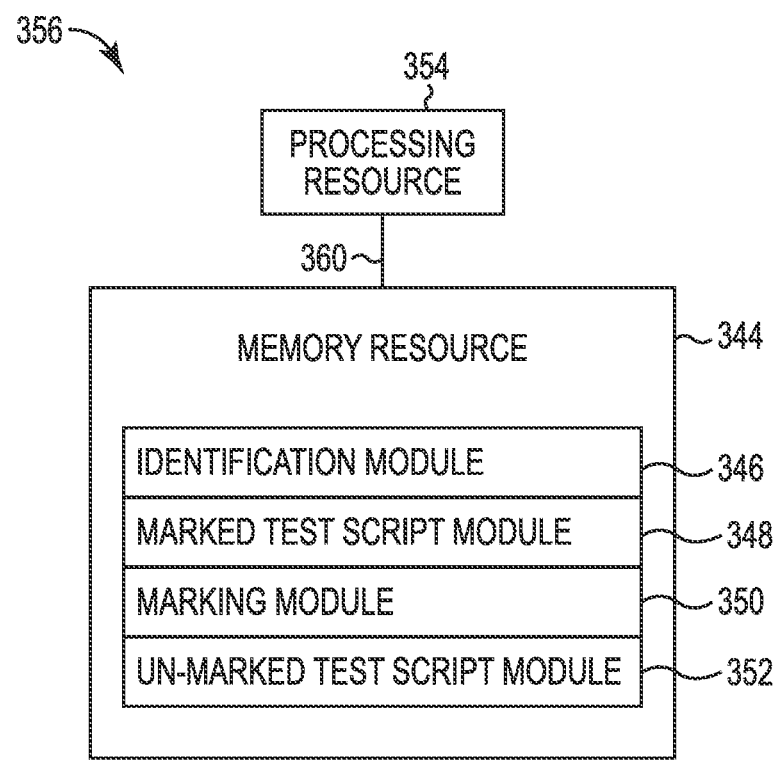
FIG. 3 is a diagram illustrating an example of a computing system according to the present disclosure.

FIG. 3 is a diagram illustrating an example of a computing system according to the present disclosure. The computing system 356 can utilize software, hardware, firmware, and/or logic to perform a number of functions.

The computing system 356 can be a combination of hardware and program instructions configured to perform a number of functions, e.g., actions. The hardware, for example, can include one or more processing resources 354 and other memory resources 344, etc. The program instructions, e.g., machine-readable instructions (MRI), can include instructions stored on memory resource 344 to implement a particular function, e.g., an action such as customer edge device problem identification.

The processing resources 354 can be in communication with the memory resource 344 storing the set of MRI executable by one or more of the processing resources 354, as described herein. The MRI can also be stored in a remote memory managed by a server and represent an installation package that can be downloaded, installed and executed. A computing device 356, e.g., server, can include memory resources 344, and the processing resources 354 can be coupled to the memory resources 344 remotely in a cloud computing environment.

Processing resources 354 can execute MRI that can be stored on internal or external non-transitory memory 344. The processing resources 354 can execute MRI to perform various functions, e.g., acts, including the functions described herein among others.

As shown in FIG. 3, the MRI can be segmented into a number of modules, e.g., an identification module 346, a marked test script module 348, a marking module 350, and an un-marked test script module 352, that when executed by the processing resource 354 can perform a number of functions. As used herein a module includes a set of instructions included to perform a particular task or action. The number of modules 346, 348, 350, and 352 can be sub-modules of other modules. For example, the identification module 346 and the marked test script module 348 can be sub-modules and/or contained within a single module. Furthermore, the number of modules 346, 348, 350, and 352 can comprise individual modules separate and distinct from one another.

In the example of FIG. 3, an identification module 346 can comprise MRI that are executed by the processing resources 354 to identify a number of test scenarios and a number of parameter types that are associated with a number of functions of a program under test that will be tested. For example, a first test scenario can be correlated with a first function that is associated with the program under test. The first test scenario can include a number of parameter types that define a number of parameters that the program under test uses in performing the first function. For example, if the program under test manages a number of logs then a test scenario that is a template for instructing the program under test to create a number of logs can include a parameter type "int log_number" that can represent an actual parameter that the program under test can use to determine a number of logs to create.

A marked test script module 348 can comprise MRI that are executed by the processing resources 354 to include the test scenarios and the parameter types in the marked test script. The marked test script can be used to create a number of instances of the test scenarios wherein the number of instances are used to test the program under test.

A marking module 350 can comprise MRI that are executed by the processing resources 354 to identify test scenarios with a mark. The test scenarios and/or the parameter types included in the marked test script can be marked to identify the test scenario and/or the parameter types as needing to be processed, e.g., modified, to create a number of instances of the test scenarios that can be used to test the program under test.

An un-marked test script module 352 can comprise MRI that are executed by the processing resources 354 to create an un-marked test script. The un-marked test script can include instances of the test scenarios that do not include the mark. The un-marked test script can include a number of instances that can be used to test the program under test. The test script can be executed by a testing program that monitors and executes a number of tests associated with the program under test 222.

A memory resource 344, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The memory resource 344 can be integral or communicatively coupled to a computing device in a wired and/or wireless manner. For example, the memory resource 344 can be an internal memory, a portable memory, and a portable disk, or a memory associated with another computing resource, e.g., enabling MRIs to be transferred and/or executed across a network such as the Internet.

The memory resource 344 can be in communication with the processing resources 354 via a communication path 360. The communication path 360 can be local or remote to a machine, e.g., a computer, associated with the processing resources 354. Examples of a local communication path 360 can include an electronic bus internal to a machine, e.g., a computer, where the memory resource 344 is one of volatile, non-volatile, fixed, and/or removable storage medium in communication with the processing resources 354 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 360 can be such that the memory resource 344 is remote from a processing resource, e.g., processing resources 354, such as in a network connection between the memory resource 344 and the processing resource, e.g., processing resources 354. That is, the communication path 360 can be a network connection. Examples of such a network connection can include local area network (LAN), wide area network (WAN), personal area network (PAN), and the Internet, among others. In such examples, the memory resource 344 can be associated with a first computing device and the processing resources 354 can be associated with a second computing device, e.g., a Java® server. For example, processing resources 354 can be in communication with a memory resource 344, wherein the memory resource 344 includes a set of instructions and wherein the processing resources 354 are designed to carry out the set of instructions.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for marked test script creation comprising:
identifying a number of test scenarios that are associated with a program under test;
identifying a number of parameter types that are associated with the number of test scenarios;
including the number of test scenarios and the number of parameter types in a marked test script;
marking the number of test scenarios in the marked test script with a mark that identifies the number of test scenarios as requiring further processing;
creating, with a computing device, a plurality of un-marked test scripts from the marked test script by replacing the parameter types in each of the number of test scenarios with a respective actual parameter to create a number of instances of the number of test scenarios in the plurality of un-marked test scripts;
wherein the plurality of un-marked test scripts are used to test the program under test; and
executing each of the plurality of un-marked test scripts on a benchmark program and on the program under test.

2. The method of claim 1, wherein marking the number of test scenarios includes marking the number of test scenarios with an in-line mark.

3. The method of claim 2, wherein the in-line mark is not associated with a syntax that is associated with the program under test.

4. The method of claim 1, wherein the number of parameter types are associated with a number of parameter files that include a number of parameters for each of the number of parameter types that are used to create the plurality of un-marked test scripts.

5. A non-transitory machine-readable storage medium storing instructions for marked test script creation executable by a machine to cause the machine to:
identify a number of test scenarios that are associated with a program under test;
identify a number of parameter types that are associated with the number of test scenarios;
create a parameter file that includes a section for each of the number of parameter types wherein each of the sections defines a range of parameters for each of the number of parameter types;
include the number of test scenarios and the number of parameter types in a marked test script;
mark the number of test scenarios in the marked test script with a mark that identifies the number of test scenarios as requiring further processing;
create a number of instances of each of the number of test scenarios based on the range of parameters in the parameter file by replacing the number of parameter types in each of the number of test scenarios with a respective actual parameter to create the number of instances of the number of test scenarios;
include the number of instances in a plurality of un-marked test scripts; and
execute each of the plurality of un-marked test scripts on a benchmark program and on the program under test.

6. The medium of claim 5, wherein the instructions executable to include the number of instances in the plurality of un-marked test scripts include instructions to remove the mark from each of the number of instances of the number of test scenarios in the plurality of un-marked test scripts.

7. The medium of claim 5, wherein each of the number of instances of the number of test scenarios in the plurality of un-marked test scripts represents one of the test scenarios with unique combination of parameters from the parameter file.

8. The medium of claim 5, wherein the instructions executable to create the number of instances of each of the number of test scenarios include instructions to create all possible instances of the number of test scenarios based on all possible combinations of the parameters that are represented in the range of parameters.

9. The medium of claim 5, wherein the instructions executable to create the number of instances of each of the number of test scenarios include instructions to create a portion of all possible instances of the number of test scenarios based on a search engine that selects instances from all of the possible instance to include in the portion of all possible instances based on a search pattern.

10. A system for marked test script creation, comprising:
  a processing resource in communication with a memory resource, wherein the memory resource includes a set of instructions, executable by the processing resource to:
  include a number of test scenarios in a marked test script wherein the number of test scenarios are identified with a mark and wherein each of the number of test scenarios includes a number of parameter types;
  create a number of parameter files wherein each of the number of parameter types is associated with one of the number of parameter files that describes a range of parameters for each of the number of parameter types;
  create a plurality of un-marked test scripts that are based on the marked test script and on the number of parameter files by replacing the number parameter types in each of the number of test scenarios with a respective actual parameter to create a number of instances of the number of test scenarios wherein each of the number of instances is associated with one of the plurality of un-marked test scripts; and
  execute each of the plurality of un-marked test scripts on a benchmark program and on a program under test.

11. The system of claim 10, wherein the instructions are executable to compare the results of an execution of the plurality of un-marked test scripts on the program under test with the results of an execution of the plurality of un-marked test scripts on the benchmark program.

12. The system of claim 11, wherein the instructions are executable to determine whether a first number of results that are associated with the program under test are equal to a second number of results that are associated with the benchmark program.

13. The system of claim 12, wherein the instructions are executable to report a failed test scenario when one of the first number of results is not equal to a corresponding one of the second number of results.

14. The system of claim 13, wherein the instructions executable to execute each of the plurality of un-marked test scripts on the benchmark program and on the program under test include instructions to modify a syntax that is associated with each of the plurality of un-marked test scripts to be compatible with a syntax that is accepted by the benchmark program and a syntax that is accepted by the program under test.

* * * * *